United States Patent
Ichimura et al.

(10) Patent No.: US 7,089,760 B2
(45) Date of Patent: Aug. 15, 2006

(54) AIR-CONDITIONER

(75) Inventors: Nobuo Ichimura, Gunma (JP); Katsunori Fujiura, Sano (JP); Kaoru Ito, Sano (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/854,965

(22) Filed: May 27, 2004

(65) Prior Publication Data

US 2004/0244411 A1 Dec. 9, 2004

(30) Foreign Application Priority Data

May 27, 2003 (JP) ............................. P2003-149589

(51) Int. Cl.
*F25B 41/00* (2006.01)
(52) U.S. Cl. ........................................................ 62/513
(58) Field of Classification Search ................. 62/113, 62/114, 174, 197, 225, 506, 513, 509
See application file for complete search history.

(56) References Cited

U.S. PATENT DOCUMENTS

| | | | |
|---|---|---|---|
| 3,955,375 A * | 5/1976 | Schumacher ................. | 62/217 |
| 4,272,970 A * | 6/1981 | Hobbs .......................... | 62/511 |
| 4,341,092 A * | 7/1982 | Davis ........................... | 62/475 |
| 5,241,829 A * | 9/1993 | Irie et al. ........................ | 62/79 |
| 5,245,833 A * | 9/1993 | Mei et al. ....................... | 62/113 |
| 5,251,603 A * | 10/1993 | Watanabe et al. ............. | 123/541 |
| 5,622,055 A * | 4/1997 | Mei et al. ....................... | 62/113 |
| 6,185,957 B1 * | 2/2001 | Voss et al. ...................... | 62/513 |
| 6,260,367 B1 * | 7/2001 | Furuya et al. ................. | 62/197 |
| 6,341,496 B1 * | 1/2002 | Kettner et al. ................. | 62/225 |
| 6,351,950 B1 * | 3/2002 | Duncan ......................... | 62/3.2 |
| 6,374,632 B1 * | 4/2002 | Nobuta et al. ................. | 62/509 |
| 6,463,757 B1 * | 10/2002 | Dickson et al. ............... | 62/503 |
| 6,467,300 B1 * | 10/2002 | Noble, III ..................... | 62/472 |
| 6,523,360 B1 * | 2/2003 | Watanabe et al. ............. | 62/204 |
| 6,615,608 B1 * | 9/2003 | Telesz et al. .................. | 62/474 |
| 6,615,610 B1 * | 9/2003 | Pettitt et al. ................... | 62/509 |
| 6,786,057 B1 * | 9/2004 | Ben Yahia .................... | 62/222 |
| 2003/0159458 A1 * | 8/2003 | Fang et al. .................... | 62/305 |

FOREIGN PATENT DOCUMENTS

| | | | |
|---|---|---|---|
| JP | 4-131667 A | * | 5/1992 |
| JP | 9-169207 A | * | 6/1997 |
| JP | 2003-21432 | | 1/2003 |

* cited by examiner

*Primary Examiner*—Mohammad M. Ali
(74) *Attorney, Agent, or Firm*—Brenda O. Holmes; Kilpatrick Stockton LLP

(57) ABSTRACT

The air-conditioner includes a compressor configured to compress and discharge a refrigerant. The air-conditioner includes a condenser configured to cool the refrigerant with air outside of a vehicle compartment. The air-conditioner includes a throttle configured to expand the refrigerant. The air-conditioner includes an evaporator configured to cool air inside of the vehicle compartment to eliminate moisture from the air by the expanded refrigerant. The air-conditioner includes a first refrigerant passage having the condensed refrigerant between the condenser and the throttle. The air-conditioner includes a second refrigerant passage having the evaporated refrigerant between the evaporator and the compressor. The air-conditioner includes a refrigerant pipe located between the first and second passages and configured to exchange heat between the condensed and evaporated refrigerants.

22 Claims, 12 Drawing Sheets

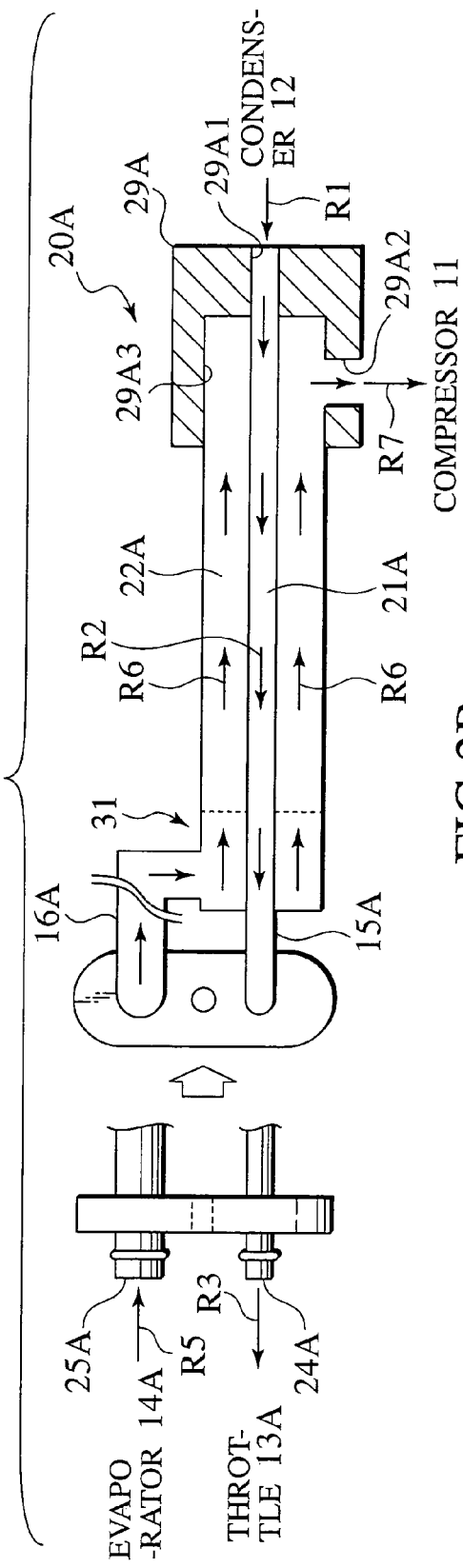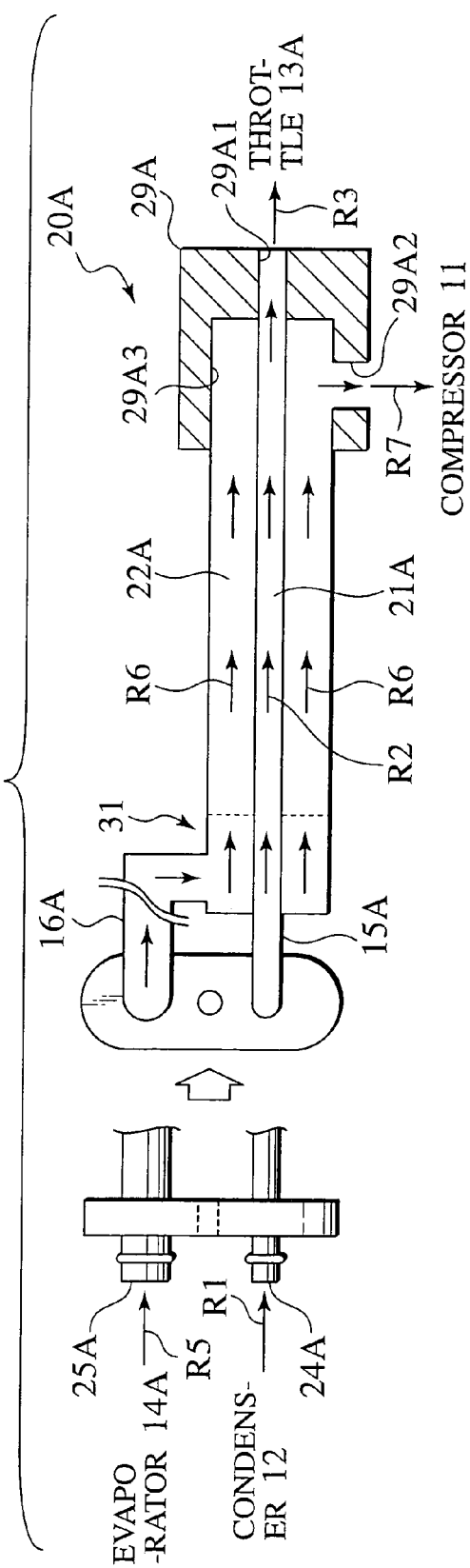

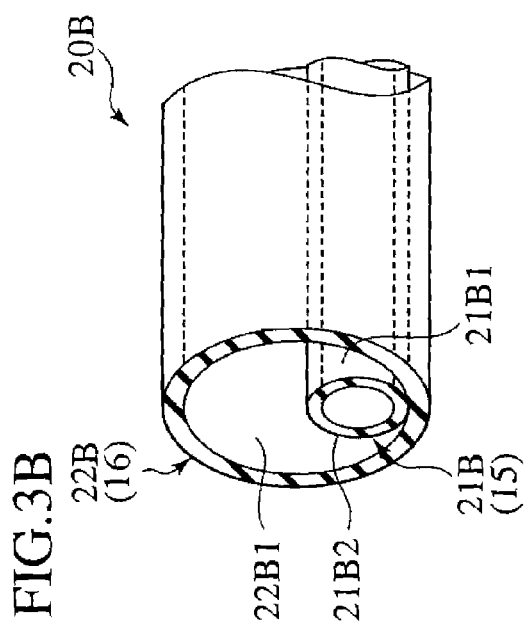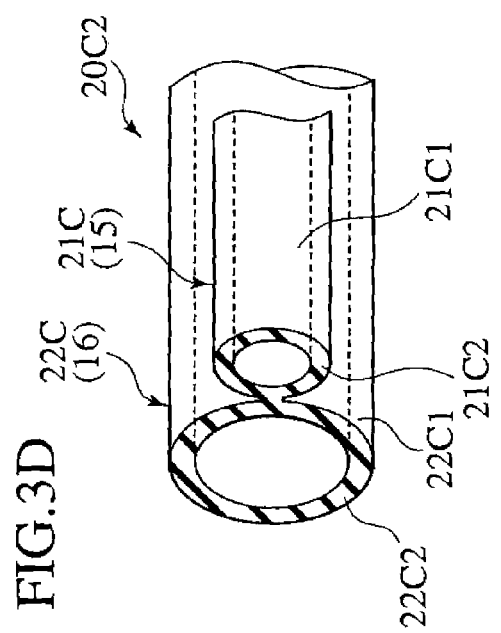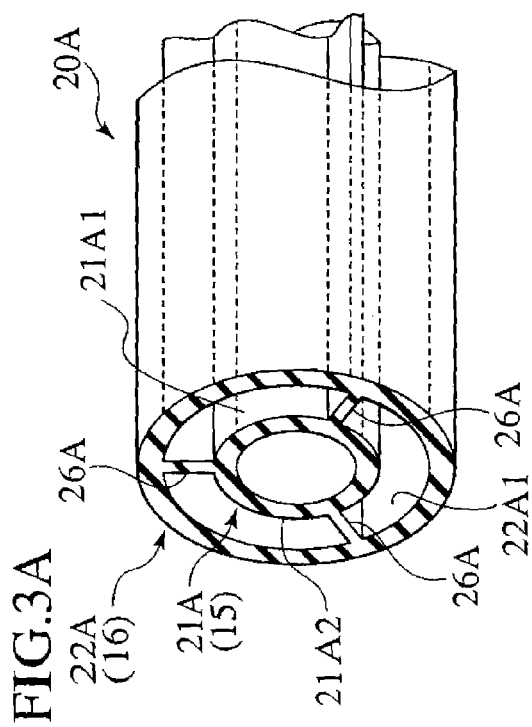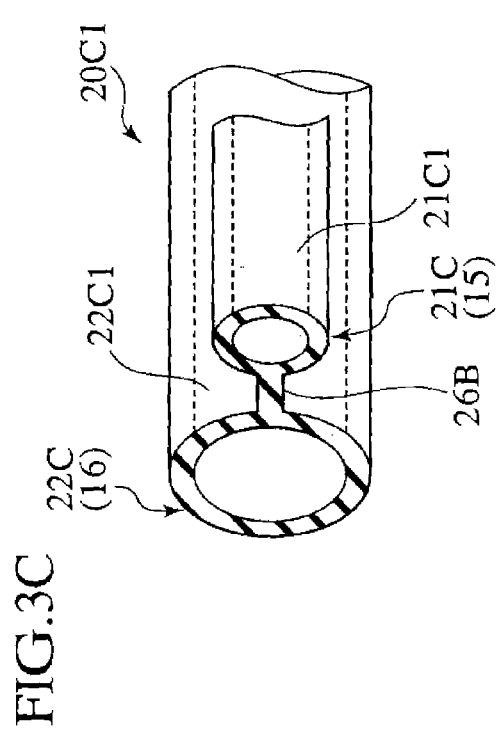

AIR-CONDITIONER

CROSS-REFERENCE TO RELATED APPLICATIONS

This application is based upon and claims the benefit of priority from Japanese Patent Application No. 2003-149589 filed on May 27, 2003; the entire contents of which are incorporated herein by reference.

BACKGROUND OF THE INVENTION

The present invention relates to an air conditioner which adjusts temperature in a vehicle compartment.

A related air conditioner includes a condenser as disclosed in a patent document (Japanese Patent Application Laid-open No. 2003-21432). This condenser includes a core having tubes and fins which are stacked on one another. The condenser includes a tank to which ends of the tubes are connected. The tank includes an inlet and an outlet for refrigerant. The refrigerant flows through tubes and is cooled by heat transferred to the core and is condensed. The tank is in fluid communication with a receiver which separates the refrigerant into a vapor phase and a liquid phase. The core includes a condensing section which condenses the refrigerant. The core also includes a subcooling section which cools the liquid phase refrigerant separated by the receiver. The subcooling section includes a tube or a fin, and a shape thereof is different from that of the tube or the fin of the condensing section. This structure enhances the cooling efficiency of the refrigerant.

SUMMARY OF THE INVENTION

The condenser of the related technique has a complicated structure and this increases the productive costs. In the related technique, the refrigerant is separated into the vapor phase and the liquid phase, and the outer size of the receiver is large, which deteriorates the assembling performance of the air conditioner.

The present invention is directed to an air conditioner having a sufficient refrigerant cooling performance and a simplified structure.

The first aspect of the invention provides the following air-conditioner. The air-conditioner includes a compressor configured to compress and discharge a refrigerant. The air-conditioner includes a condenser configured to cool the refrigerant with air outside of a vehicle compartment. The air-conditioner includes a throttle configured to expand the refrigerant. The air-conditioner includes an evaporator configured to cool air inside of the vehicle compartment to eliminate moisture from the air by the expanded refrigerant. The air-conditioner includes a first refrigerant passage having the condensed refrigerant between the condenser and the throttle. The air-conditioner includes a second refrigerant passage having the evaporated refrigerant between the evaporator and the compressor. The air-conditioner includes a refrigerant pipe located between the first and second passages and configured to exchange heat between the condensed and evaporated refrigerants.

The refrigerant pipe may separate the condensed refrigerant into gaseous and liquid refrigerants through the first refrigerant passage.

The refrigerant pipe may include a heat-transfer member longitudinally located thereof and configured to allow refrigerants in the first and second refrigerant passages to exchange heat with each other through the heat-transfer member.

The heat-transfer member integrally interconnects an outer peripheral surface of the second refrigerant passage and an inner peripheral surface of the first refrigerant passage.

The refrigerant pipe may include a double-tube structure. The double-tube structure includes an outer tube in fluid communication with one of the first and second refrigerant passages. The double-tube structure includes an inner tube located inside of the outer tube and is in fluid communication with the other one of the first and second refrigerant passages.

The inner tube may be in fluid communication with the second refrigerant passage. The outer tube is in fluid communication with the first refrigerant passage.

The heat-transfer member may integrally interconnect an outer peripheral surface of the first passage and an outer peripheral surface of the second passage.

The heat-transfer may separate the first and second refrigerant passages from each other.

The heat-transfer member may integrally interconnect the first and second refrigerant passages. The refrigerant pipe is mountable in various directions.

The first refrigerant passage may be located lower than a refrigerant outlet of the condenser.

The second aspect of the invention provides the following air-conditioner. The air-conditioner includes a condenser configured to cool a first refrigerant by air-flow during running of a vehicle to be discharged as a second refrigerant. The air-conditioner includes an expansion valve configured to expand the second refrigerant to be discharged as a third refrigerant. The air-conditioner includes an evaporator configured to evaporate the third refrigerant to be discharged as a fourth refrigerant, cooling air inside of a vehicle compartment. The air-conditioner includes a compressor configured to compress the fourth refrigerant to be discharged as the first refrigerant. The air-conditioner includes a heat exchanger configured to exchange heat between the second and fourth refrigerants.

The heat exchanger may include a first fluid passage having one refrigerant of the second and fourth refrigerants to flow therethrough. The heat exchanger includes a second fluid passage having the other refrigerant of the second and fourth refrigerants to flow therethrough.

The first and second fluid passages may be located concentrically with each other.

The first and second fluid passages may be located eccentrically with each other.

The heat exchanger may include a tube separated into the first and second fluid passages.

The first and second fluid passages may connect longitudinally side-by-side with each other.

The heat exchanger may have an inlet and an outlet for the second refrigerant to flow therethrough. The outlet is positioned lower than the inlet.

BRIEF DESCRIPTION OF THE ACCOMPANYING DRAWINGS

FIG. 2A is a schematic diagram of a primary portion of a double-tube structure shown in FIG. 1B;

FIG. 2B is a schematic diagram of a primary portion of a double-tube structure modified on that in FIG. 2A;

FIG. 3A is a perspective view of a double-tube shown in FIG. 1B;

FIGS. 3B to 3F are perspective views of double-tubes modified on that in FIG. 3A;

DETAILED DESCRIPTION OF THE PREFERRED EMBODIMENTS

Figure 1A:
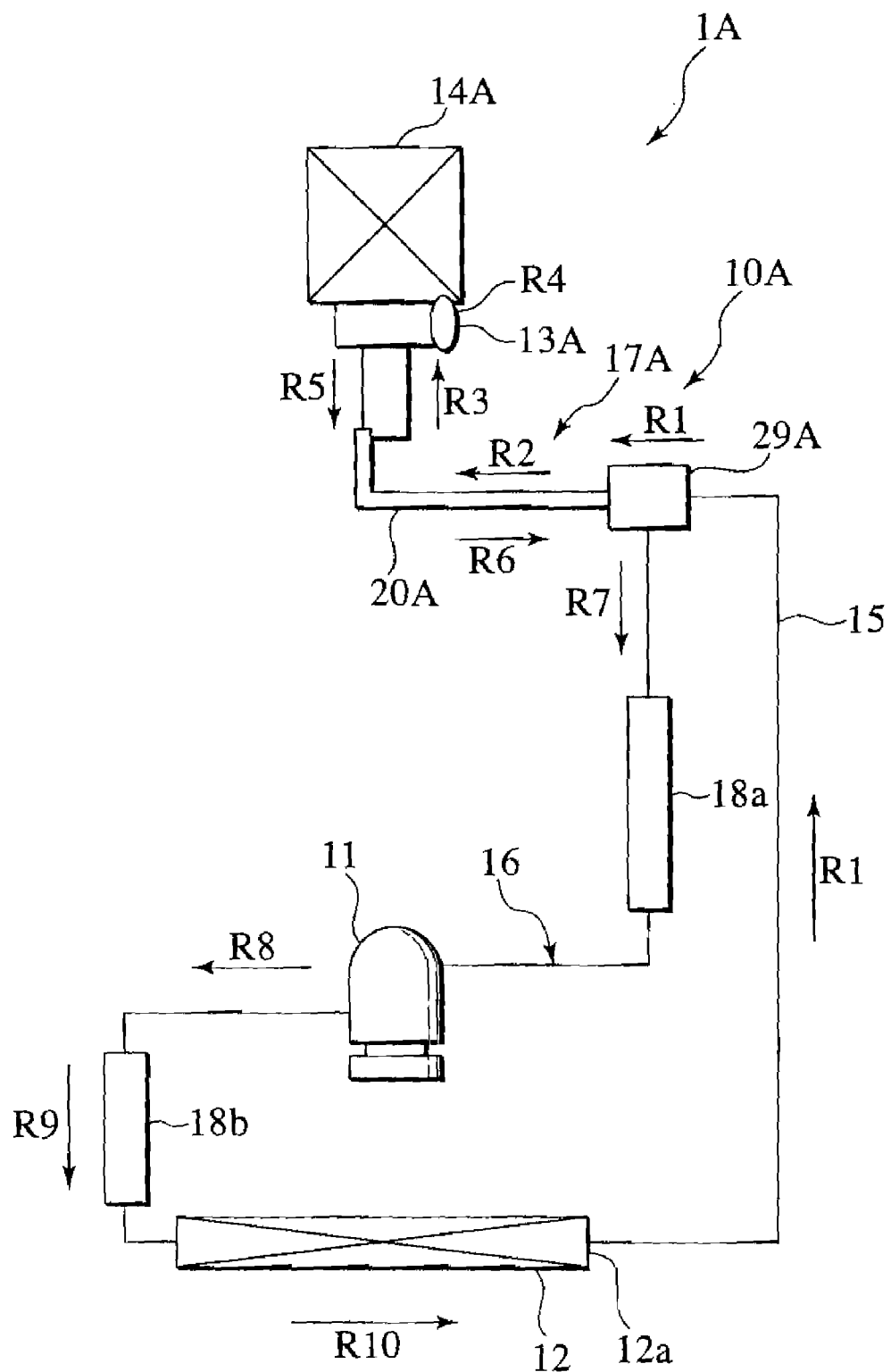
FIG. 1A is a schematic diagram of an air-conditioner according to the present invention, where an air-conditioner is adapted to a vehicle.

The following describes embodiments of the present invention with reference to the accompanying drawings. In the embodiments, like members or parts are designated with like reference characters.

First Embodiment

A vehicle air-conditioner 10A includes a heat pump type refrigeration cycle 1A where a refrigerant circulates. The refrigeration cycle 1A is separated into cycles inside and outside of a vehicle compartment. The refrigeration cycle 1A includes a compressor 11 which compresses the refrigerant to be discharged. The compressor 11 compresses the refrigerant into a high temperature and high pressure. The refrigeration cycle 1A includes a condenser 12 which cools the compressed refrigerant with air from the outside of the vehicle compartment. The refrigeration cycle 1A also includes a throttle 13A as an expansion valve which expands the refrigerant cooled by the condenser 12. The refrigeration cycle 1A includes an evaporator 14A which cools and dehumidifies the air inside of the compartment by the expanding refrigerant. The evaporator 14A expands the refrigerant to be reduced in pressure, which is sent into the compressor 11 and is circulated therein.

The condenser 12 and the throttle 13A include a refrigerant passage 15 therebetween. The evaporator 14A and the compressor 11 include a refrigerant passage 16 therebetween. The refrigerant passages 15 and 16 include therebetween a refrigerant tube 17 for exchanging heat between refrigerants. The condenser 12 has flexible tubes 18a and 18b connected to the inlet and outlet thereof.

In FIG. 2A, the refrigerant tube 17A includes a metal double-tube structure 20A with a relatively high thermal conductivity such as aluminum.

The double-tube structure 20A includes an inner tube 21A in fluid communication with the refrigerant passage 15 between the condenser 12 and the throttle 13A. The double-tube structure 20A includes an outer tube 22A in fluid communication with the refrigerant passage 16 between the evaporator 14A and the compressor 11.

Figure 1B:
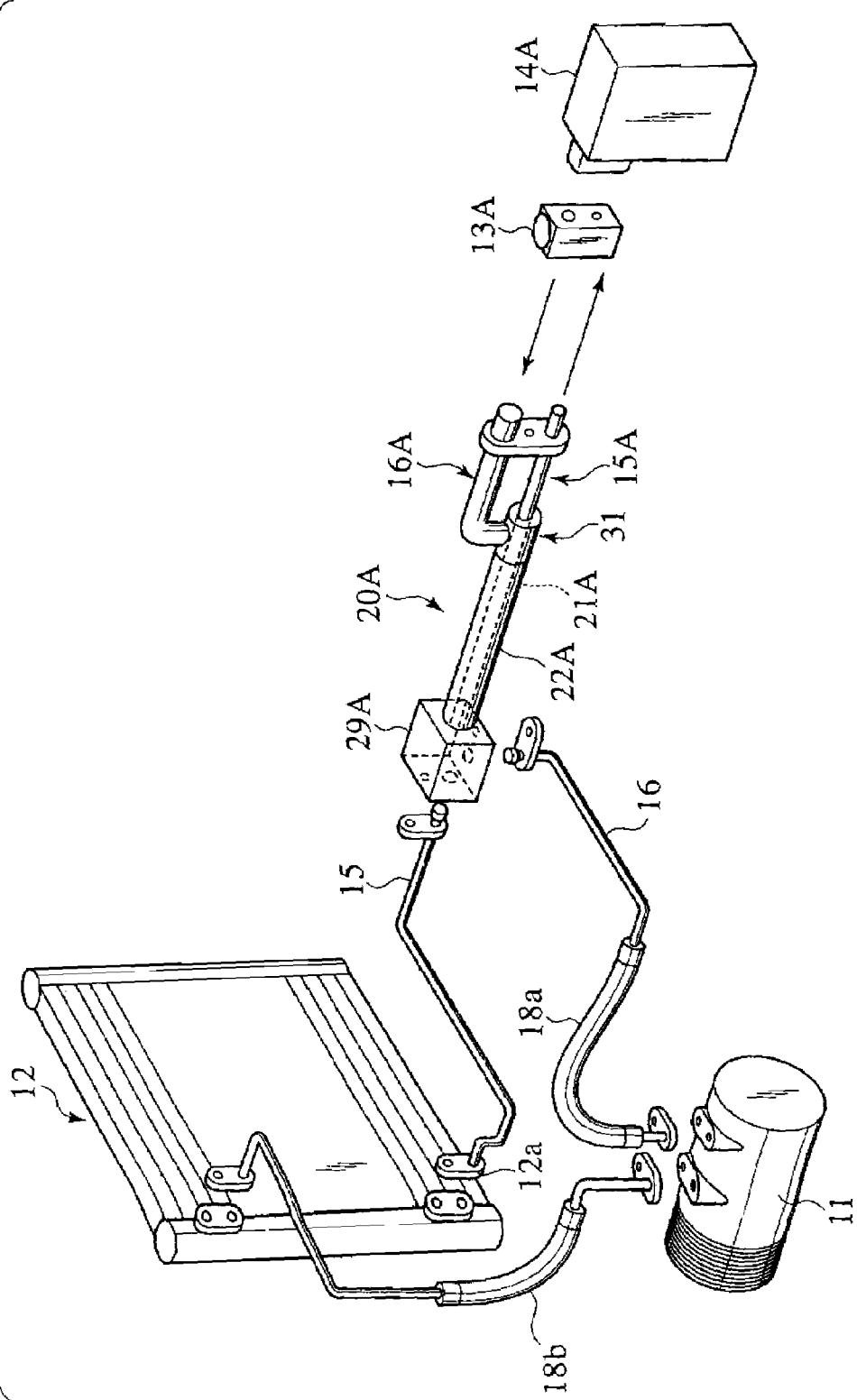
FIG. 1B is a perspective view of the air-conditioner in FIG. 1A.

Referring to FIG. 1B, the condenser 12 and the throttle 13A include the refrigerant passage 15 therebetween which is positioned lower than a refrigerant discharging outlet 12a of the condenser 12. The refrigerant passage 15 includes the double-tube structure 20A with tubes which are disposed in a substantially horizontal position.

Specifically, referring to FIG. 3A, the double-tube structure 20A includes the outer tube 22A, and the inner tube 21A centrally inside of the outer tube 22A. The outer and inner tube 22A and 21A are concentric with each other about the axis. The double-tube structure 20A includes three heat-transfer members 26A which integrally interconnect the outer and inner tubes 22A and 21A. The heat-transfer members 26A are arranged at equal angular intervals about the axis. The heat-transfer members 26A extend radially from the outer peripheral surface 21A1 of the inner tube 21A to the inner peripheral surface 22A1 of the outer tube 22A, and extend longitudinally of the outer and inner tubes 22A and 21A. The inner tube 21A and the outer tube 22A have refrigerants respectively, which exchange heat with each other through the wall 21A2 of the inner tube 21A and the heat-transfer members 26A.

In FIGS. 1A and 1B, the double-tube structure 20A includes a coupling 29A which interconnects the outer tube 22A and the refrigerant passage 16 and interconnects the inner tube 21A and the refrigerant passage 15.

Figure 2C:
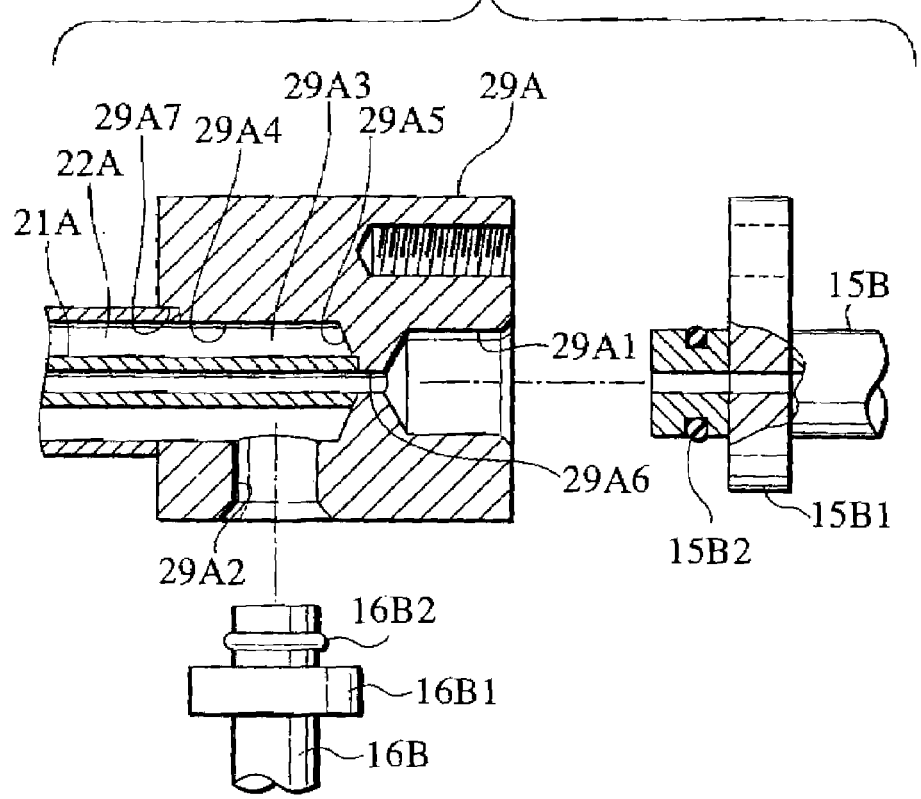
FIG. 2C is an enlarged sectional view of a coupling in FIG. 2A.

Referring to FIG. 2A, the coupling 29A includes a passage 29A1 in fluid communication with the inner tube 21A and the condenser 12. The coupling 29A includes a passage 29A2 in fluid communication with the outer tube 22A and the compressor 11. The coupling 29A includes a passage 29A3 as a recess in fluid communication with the passage 29A2 on the side 29A4 (refer to FIG. 2C).

Referring to FIG. 2C, the passage 29A1 has a pipe 15B with the end inserted therein. The pipe 15B includes a flange 15B1 brought in contact with the coupling 29A. The pipe 15B has an O-ring 15B2 sealing between the passage 29A1 and pipe 15B.

The passage 29A2 has a pipe 16B having the end inserted therein. The pipe 16B has a flange 16b1 brought in contact with the coupling 29A. The pipe 16B has an O-ring sealing between the passage 29A2 and pipe 16B.

The passage 29A3 has the inner pipe 21A inserted thereinto. The inner pipe 21A has an end which is fixed to the entrance periphery of a hole 29A6 at the bottom 29A5 of the passage 29A3. The inner tube 21A is in fluid communication with passage 29A1 through the hole 29A6. The passage 29A3 has an entrance periphery 29A7 to which the outer pipe 22A is fixed.

Figure 2D:
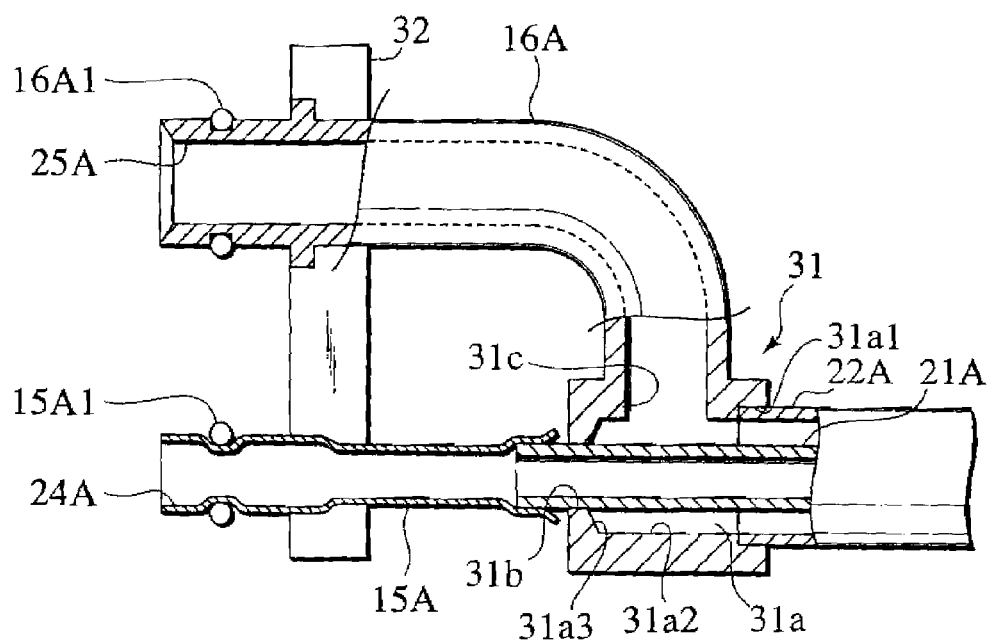
FIG. 2D is an enlarged sectional view of another coupling in FIG. 2A.

Referring to FIG. 2D, the double-tube structure 20A includes a coupling 31 connected therewith at the opposite end. The coupling 31 has a passage 31a as a recess. The passage 31a has an entrance periphery 31a1 to which the outer pipe 22A is fixed. The passage 31a has a side 31a2 and a bottom 31a3 having holes 31b and 31c, respectively. The passage 31a has the inner pipe 21A inserted thereinto. The inner pipe 31b extends longitudinally outward through the hole 31b at the bottom 31a3. The inner pipe 31b has another pipe 15A fitted therewith at the end. The pipe 15A is in fluid communication with the throttle 13A through the outlet 24A.

The coupling 31 is integrated with a pipe 16A. The pipe 16A is in fluid communication with the passage 31a on the side 31a2 through the hole 31c and evaporator 14A through inlet 25A. The pipe 16A extends transversely to the passage 31a, and curves to extend longitudinally of the passage 31a.

The pipes 15A and 16A have a flange 31 interconnecting them and have O-rings 15A1 and 16A1 on the outsides, respectively.

The following describes the operations of the refrigeration cycle 1A and the air-conditioner 10A.

Referring to FIG. 1A, a refrigerant R1 flows out of the outlet 12a of the condenser 12. The refrigerant R1 flows into the refrigerant tube 17A of the double tubes as a refrigerant R2. The refrigerant R2 runs through the double-tube structure 20A, and flows out as a refrigerant R3. The refrigerant R3 flows into the throttle 13A where the refrigerant is isenthalpic expanded, and flows out as a refrigerant R4. The refrigerant R4 flows into the evaporator 14A where the refrigerant is evaporated to absorb heat from the air inside of the vehicle compartment, thereby reducing the temperature inside of the vehicle compartment, and flows out as a refrigerant R5. The refrigerant R5 flows into the refrigerant tube 17A as a refrigerant R6. The refrigerant R6 flows through the double-tube structure 20A, and flows out as a refrigerant R7. The refrigerant R7 flows into the compressor 11 where the refrigerant is isentropically compressed, and flows out as refrigerant R8. The refrigerant R8 or R9 flow into the condenser 12 as a refrigerant R10 where the refrigerant R10 is condensed to discharge heat, and flows out as the refrigerant R1.

The operation of the double-tube structure 20A is further described with reference to FIG. 2A. The refrigerant R1 flows from the condenser 12 into the passage 29A1 of the coupling 29A as the refrigerant R2. The refrigerant R2 runs through the inner pipe 21A via the passage 29A3, flowing out from the outlet 24A of pipe 15A toward the throttle 13A as the refrigerant R3. While, the refrigerant R5 flows from the evaporator 14A into the inlet 25A of the pipe 16A as the refrigerant R6. The refrigerant R6 runs through the coupling 31 and the outer tube 22A toward the passage 29A3, and flows out of the passage 29A2 toward the compressor 11 as the refrigerant R7.

Specifically, the refrigerants R2 and R6 flow in the opposite directions from each other, and exchange heat with each other. Heat is conducted from the refrigerant R2 to the refrigerant R6 through the wall 21A1 of the inner tube 21A and the heat-transfer members 26A (refer to FIG. 3A).

Figure 4A:
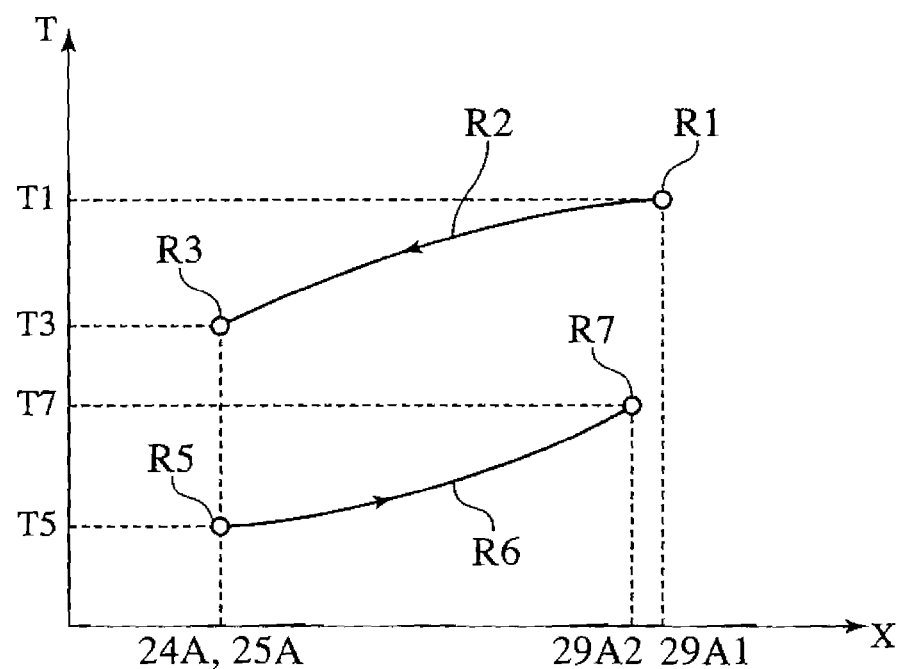
FIG. 4A shows temperature variations of refrigerants along inner and outer tubes of the double-tube structure shown in FIG. 2A.

Referring to FIG. 4A, the following describes temperature variations of the refrigerants R2 and R6 in the inner and outer tubes 21A and 22A. As the refrigerant R2 runs through the inner tube 21A toward the outlet 24A of pipe 15A, the refrigerant R2 is cooled at a temperature from T1 to T3. While, as the refrigerant R6 runs through the outer tube 22A toward the passage 29A2, the refrigerant R6 is heated at a temperature from T5 to T7.

Figure 4B:
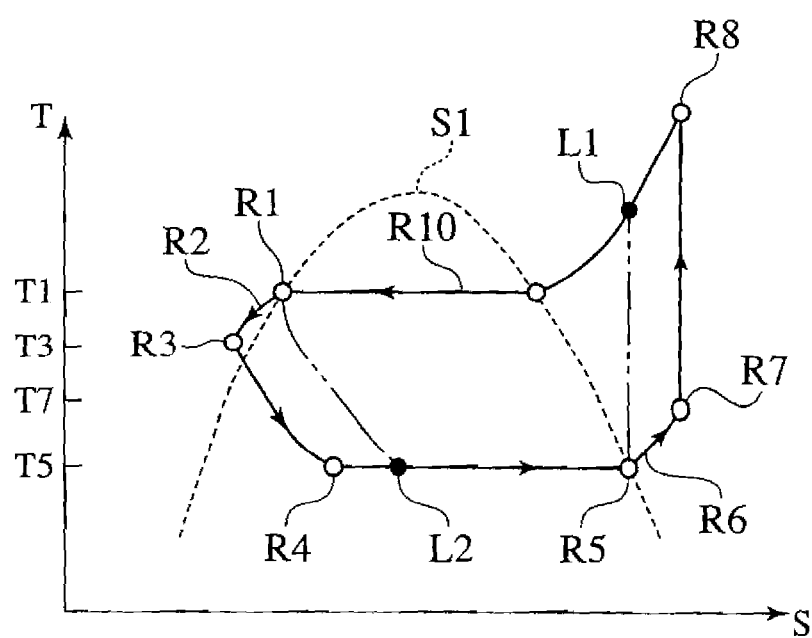
FIG. 4B is a T-S (temperature-entropy) diagram of the refrigeration cycle in FIG. 1A, where a dotted line S1 indicates a vapor-liquid saturation line.

Referring to FIG. 4B, the refrigerant R1 to R10 has variations in state and heat. The refrigerant R1 in saturated liquid flows into the double-tube structure 20A, where the refrigerant R2 is cooled, turning into the refrigerant R3 in supercooled liquid. The refrigerant R3 is isenthalpic expanded by the throttle 13A, turning into refrigerant R4 in wet saturated vapor having lower pressure and temperature. The refrigerant R4 is heated under a constant pressure, turning into the refrigerant R5 in dry saturated vapor. The refrigerant R5 flows into the double-tube structure 20A, where refrigerant R6 is further heated, turning into the refrigerant R7 in superheated vapor. The refrigerant R7 is isentropically compressed by the compressor 11, turning into the refrigerant R8 in vapor with a higher temperature and pressure. The refrigerant R8 flows into the condenser 12, where the refrigerant RIO in dry saturated vapor is cooled by the condenser 12 under a constant pressure, turning into the refrigerant R1.

Specifically, the heat-exchange in the double-tube structure 20A permits a quantity of heat Q1 to be discharged during the process from the refrigerant R1 to the refrigerant R3, and a quantity of heat Q2 to be absorbed during the process from the refrigerant R5 to the refrigerant R7. The quantity of heat Q1 is equal to the quantity of heat Q2.

The refrigerant R4 to R5 in the refrigeration cycle 1A absorbs a quantity of heat from air inside of the compartment, which is defined as Q3. The quantity of heat Q3 is equal to integration of temperature at T5 relative to entropy from refrigerant R4 to refrigerant R5. While, a refrigeration cycle L1, R1, L2, and R5 represents a cycle without the heat exchange, and a refrigerant absorbs a quantity of heat from air inside of the vehicle compartment, which is defined as Q4. The quantity of heat Q4 is equal to the integration of temperature at T5 relative to entropy from the refrigerant L2 to the refrigerant R5. As is apparent from FIG. 4B, the quantity of heat Q3 is greater than the quantity of heat Q4. Thus, heat exchange of the double-tube structure 20A improves the refrigeration cycle 1A in cooling performance and coefficient of performance (absorption heat of refrigerant/work of compressor).

According to this embodiment, the double-tube structure 20A includes a heat exchanging function capable of exchanging heat between the refrigerant R2 in the refrigerant passage 15 between the condenser 12 and the throttle 13A, and the refrigerant R6 in the refrigerant passage 16 between the evaporator 14A and the compressor 11. The double-tube structure 20A further includes a gas/liquid separating function of refrigerant in the refrigerant passage 15 between the condenser 12 and the throttle 13A. This structure eliminates the necessity of a heat exchanging unit and a gas/liquid separating unit, and realizes the air conditioner 10A having a sufficient refrigerant-cooling performance and a simplified entire structure.

The refrigerant pipe 17 eliminates the necessity of a refrigerant reserving unit such as a liquid tank and a modulator. This reduces the amount of refrigerant to be charged in the pipe.

The double-tube structure 20A having the relatively simple structure has the heat exchanging function, and the cooling performance of a refrigerant enhances without increasing the productive costs and increasing the entire apparatus in size. The double-tube structure 20A is made of metal having relatively high thermal conductivity such as aluminum. This structure efficiently transfers the heat between the inner tube 21A and the outer tube 22A, endures the refrigerant with a pressure, and forms a tube having high hermeticity. In addition, aluminum having relatively small specific gravity reduces the entire apparatus in weight.

The double-tube structure section is not limited in the mounting direction. This allows the double-tube structure 20A to be disposed in the tube, without ensuring another place where the double-tube structure 20A is to be assembled. This structure ensures a sufficient refrigerant cooling function, and facilitates the assembling operation of the air conditioner 10A.

The refrigerant passage 15 is provided between the condenser 12 and the throttle 13A and is positioned lower than the refrigerant discharging outlet 12a. This passage 15 improves the heat exchange efficiency of the condenser 12 without reserving the liquid phase refrigerant in the condenser 12. The passage 15 further improves the gas/liquid separating function of the refrigerant, and the passage 15 leads the liquid phase refrigerant into the throttle 13.

A higher pressure liquid phase refrigerant flows through the inner tube 21A of the double-tube structure 20A, while a lower pressure gas phase refrigerant flows through the outer tube 22A. This manner reduces the volume of the entire pipe, and reduces the amount of refrigerant to be charged into the pipe.

As another embodiment, the refrigerant R2 may pass through the outer tube 22A and the refrigerant R6 may pass through the inner tube 21A.

Referring to FIG. 2B, the refrigerants R2 and R6 flow in identical directions in the inner tube 21A and the outer tube 22A to exchange heat with each other.

Referring to FIG. 3B, a double-tube structure 20B includes an outer tube 22B, and an inner tube 21B which are eccentric with each other. The inner tube 21B has an outer surface 21B1 joined to the inner surface of the outer tube 22B. This structure allows refrigerants R2 and R6 to exchange heat with each other through the wall 21B2 of inner tube 21B.

Referring to FIG. 3C, a double-tube structure 20C1 includes an outer tube 22C and an inner tube 21C which are arranged longitudinally side-by-side with each other. The double-tube structure 20C1 includes a heat-transfer member 26B which integrally interconnects the outer and inner tubes 22C and 21C. The heat-transfer member 26B extends longitudinally between the outer and inner tubes 22C and 21C. This structure allows refrigerants R2 and R6 to exchange heat with each other through the heat-transfer member 26B.

Referring to FIG. 3D, a double-tube structure 20C2 differs from the double-tube structure 20C1 in that the outer and inner tubes 22C and 21C connect with each other, with the outer surfaces 21C1 and 22C1 being in contact with each other. This structure 20C2 achieves lower productive costs and a smaller size in comparison with the double-tube structure 20C1.

Figure 3E:
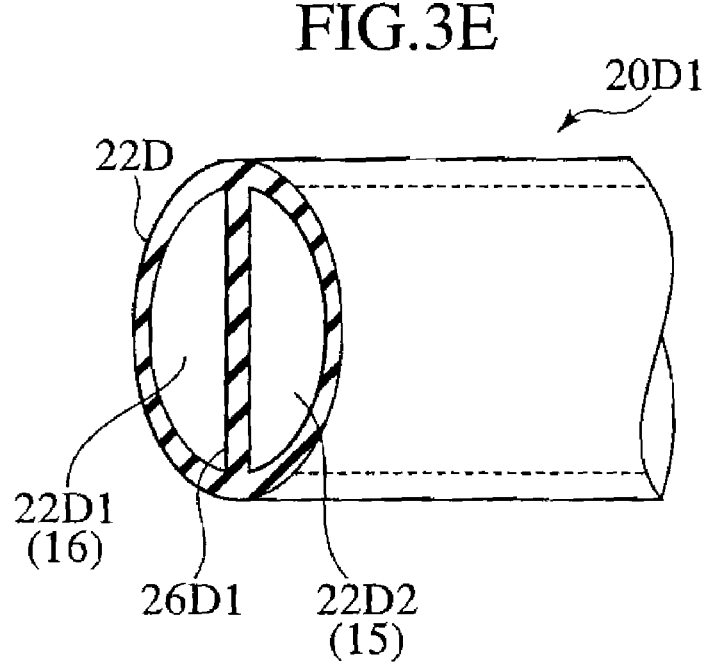

Referring to FIG. 3E, a double-tube structure 20D1 includes a tube 22D having two fluid passages 22D1 and 22D2, which are separated from each other by a straight heat-transfer member 26D1. The fluid passage 22D1 is in communication with the refrigerant passage 16, and the fluid passage 22D2 is in communication with the refrigerant passage 15. This structure allows refrigerants R2 and R6 in fluid passages 22D1 and 22D2 to exchange heat with each other through the heat-transfer member 26D1. This structure achieves lower productive costs and a smaller size.

Figure 3F:
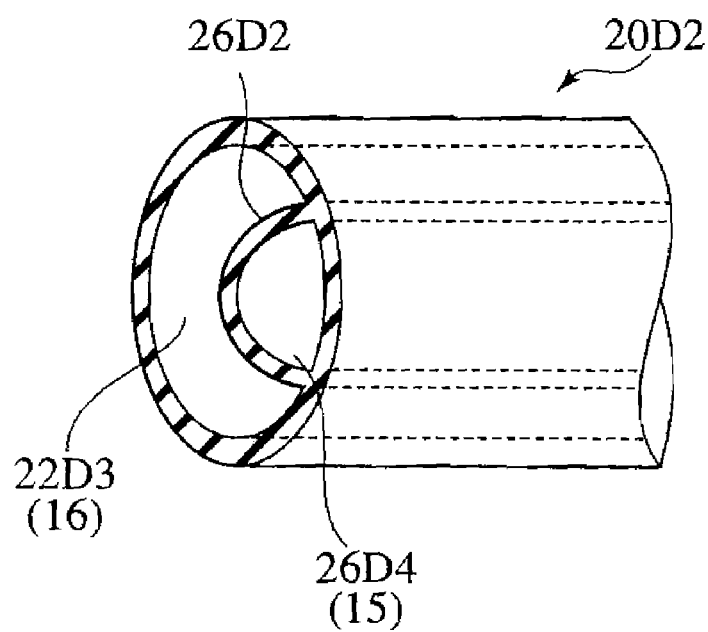

Referring to FIG. 3F, a double-tube structure 20D2 differs from the double-tube structure 20D1 in that a curved heat-transfer member 26D2 separates the interior of the tube 22D into two fluid passage 22D3 and 22D4.

Figure 2E:
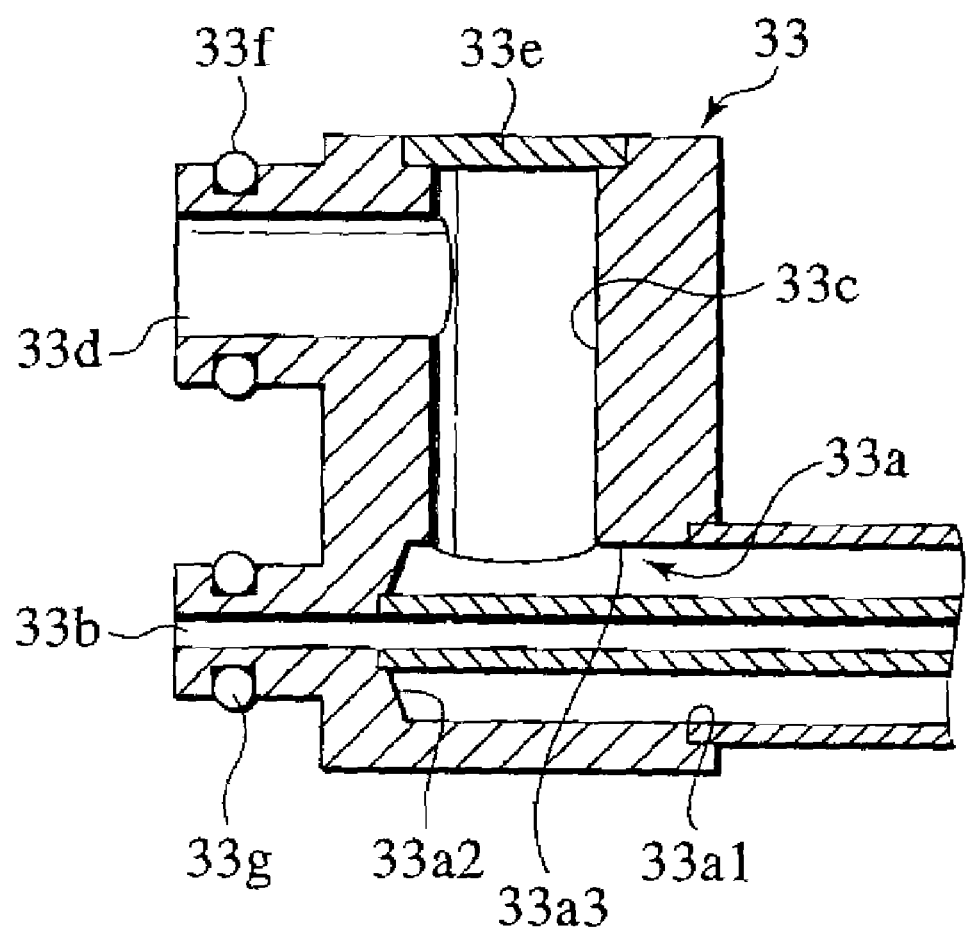
FIG. 2E is an enlarged sectional view of a coupling modified on that in FIG. 2D.

Referring to FIG. 2E, the double-tube structure 20A includes another coupling 33 in place of coupling 31. The coupling 33 has a passage 33a as a recess in fluid communication with the outer pipe 22A. The coupling 33 has passage 33b as a hole in fluid communication with the inner tube 21A and the throttle 13. The coupling 33 has passages 33c and 33d as a hole in fluid communication with the passage 33a and the evaporator 14A.

The passage 33a has the outer pipe 22A fixed to the entrance periphery 33a1. The passage 33a has the inner pipe 21A inserted thereinto. The inner pipe 21A is fixed to the entrance periphery of the passage 33b on the bottom 33a2 of passage 33a.

The passage 33b is aligned with the passage 33a. The passage 33b has a smaller size in cross section than the passage 33a. The passage 33c extends transversely from the side 33a3 of the passage 33a. The passage 33c has an opening at the end, which is closed by a lid 33e. The passage 33c communicates with a passage 33d which extends transversely to the passage 33c and extends side-by-side with the passage 33a. The passages 33b and 33d have O-rings 33g and 33f on the outsides, respectively.

Figure 5:
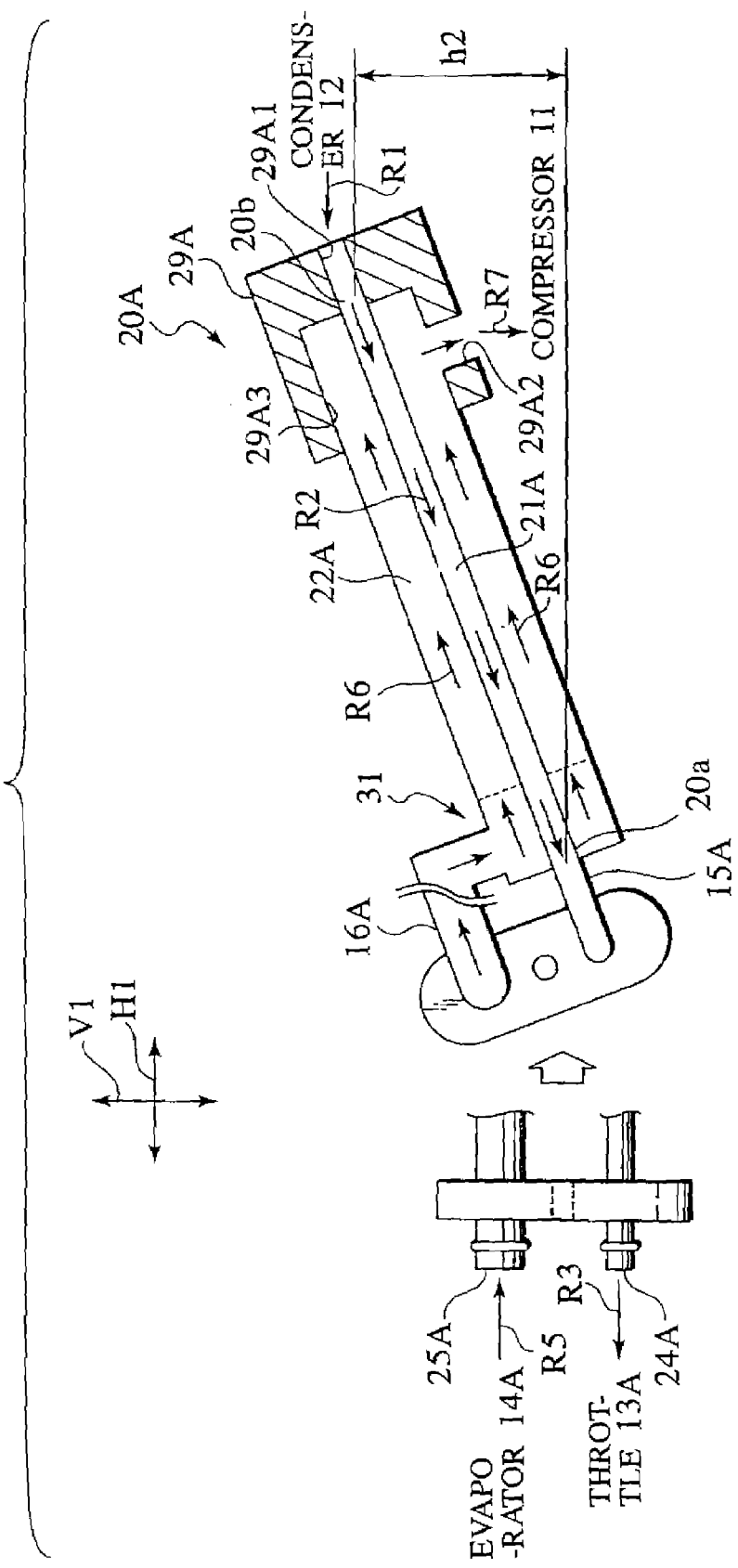
FIG. 5 is schematic view of a double-tube structure modified on that in FIG. 2A, where V1 indicates a vertical direction and H1 indicates a horizontal direction.

Referring to FIG. 5, the double-tube structure 20A inclines downwardly toward the throttle 13A from the condenser 12 or upwardly toward the compressor 11 from the evaporator 14A. Specifically, the double-tube structure 20A is longitudinally inclined relative to a horizontal line H1 to descend toward the throttle 13A or evaporator 14A. The double-tube structure 20A has longitudinally opposed ends 20a and 20b as an outlet and an inlet proximate to throttle 13A and condenser 12, respectively. The end 20a is positioned lower than the end 20b at a vertical interval h2 therebetween. This structure further enhances the gas/liquid separating function of a refrigerant, thus allowing the refrigerant to be efficiently separated into gaseous and liquid refrigerants.

Second Embodiment

Figure 6:
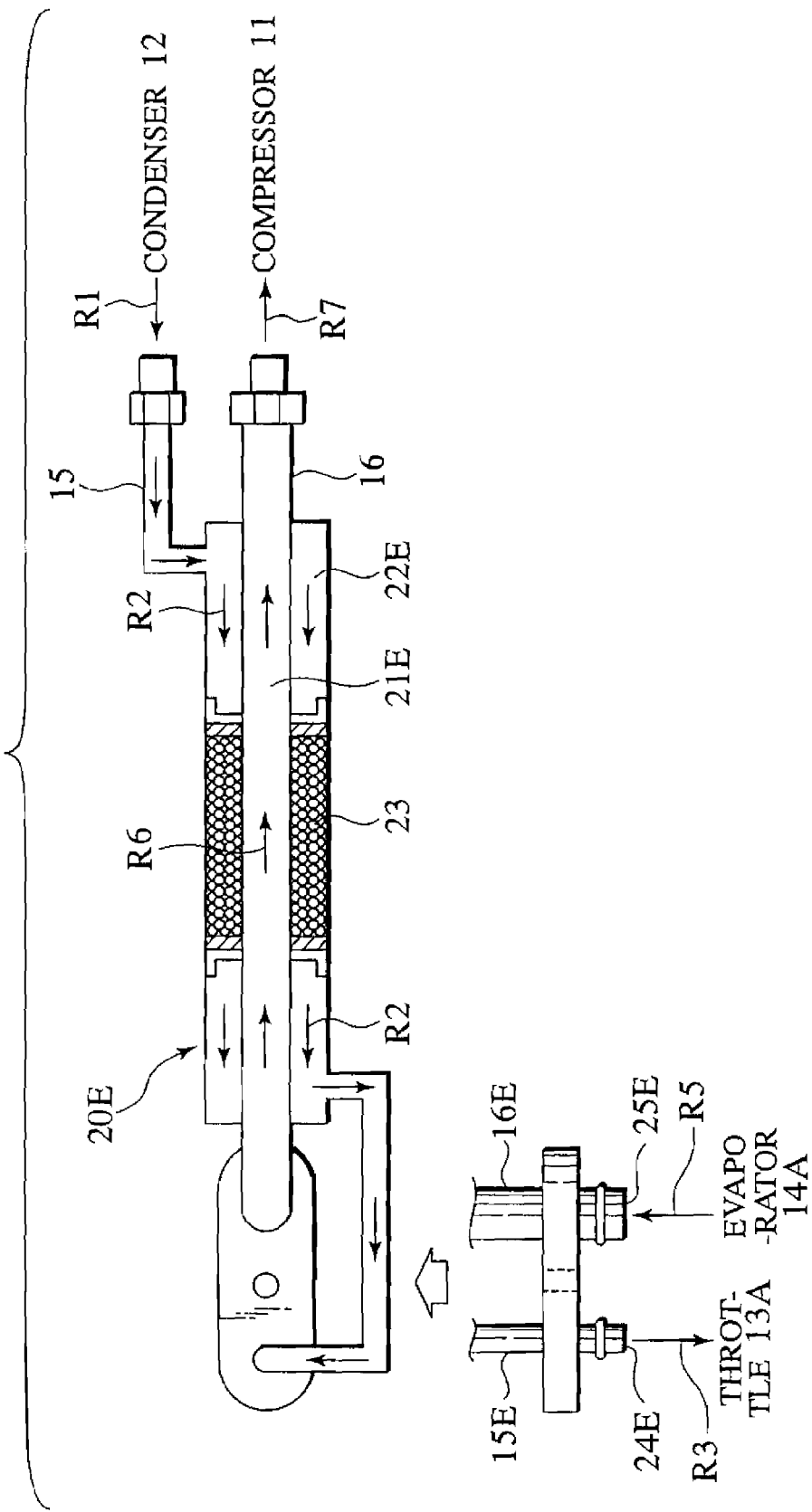
FIG. 6 is a schematic diagram of a primary portion of a double-tube structure included in an air-conditioner according to a second embodiment, where the inner and outer tubes have a drying agent filled therebetween.

Referring to FIG. 6, a double tube structure 20E includes an outer pipe 22E, through which a refrigerant flows from the condenser 12 to the throttle 13A. The double tube structure 20E includes an inner pipe 21E, through which a refrigerant flows from the evaporator 14A to the compressor 11.

The outer tube 22E includes a drying agent 23 charged therein such that a refrigerant can flow through the outer tube 22E. While the refrigerant flows through the outer tube 22A, the drying agent 23 adsorbs moisture absorbed by the refrigerant during circulating in the refrigeration cycle.

The following describes the operation of air-conditioner 10E. A refrigerant R1 flows from the condenser 12 into the outer pipe 22E as a refrigerant R2. While the refrigerant R2 runs through the drying agent 23, the agent 23 absorbs moisture from the refrigerant R2. The refrigerant R2 flows out of the outlet 24E of pipe 15E toward throttle 13A as a refrigerant R3. While, a refrigerant R5 flows from the evaporator 14A into the inlet 25E of the pipe 16E as a refrigerant R6. The refrigerant R6 runs through an inner pipe 21E, where the refrigerant R6 exchanges heat with refrigerant R2 through the inner pipe 21E. The refrigerant R2 flows out of the pipe or refrigerant passage 16 toward the compressor 11 as a refrigerant R7.

According to the embodiment, the inner tube 21E of the double-tube structure 20E is in fluid communication with the refrigerant passage 16 between the evaporator 14A and the compressor 11. The outer tube 22E of the double-tube structure 20E is in fluid communication with the refrigerant passage 15 between the condenser 12 and the throttle 13A. This structure has sufficient refrigerant cooling performance, and ensures a volume of the passage between the condenser 12 and the throttle relatively easily. This structure further enhances the gas/liquid separating performance of the refrigerant.

The outer tube 22E includes the charged drying agent 23 through which a refrigerant can flow. While the refrigerant R2 flows through the outer tube 22A, the drying agent 23 adsorbs moisture which the refrigerant absorbs during circulating in the refrigeration cycle. This adsorption prevents a refrigerant from becoming deteriorated, and stably maintains the vehicle air conditioner 10E in cooling performance.

Third Embodiment

Figure 7:
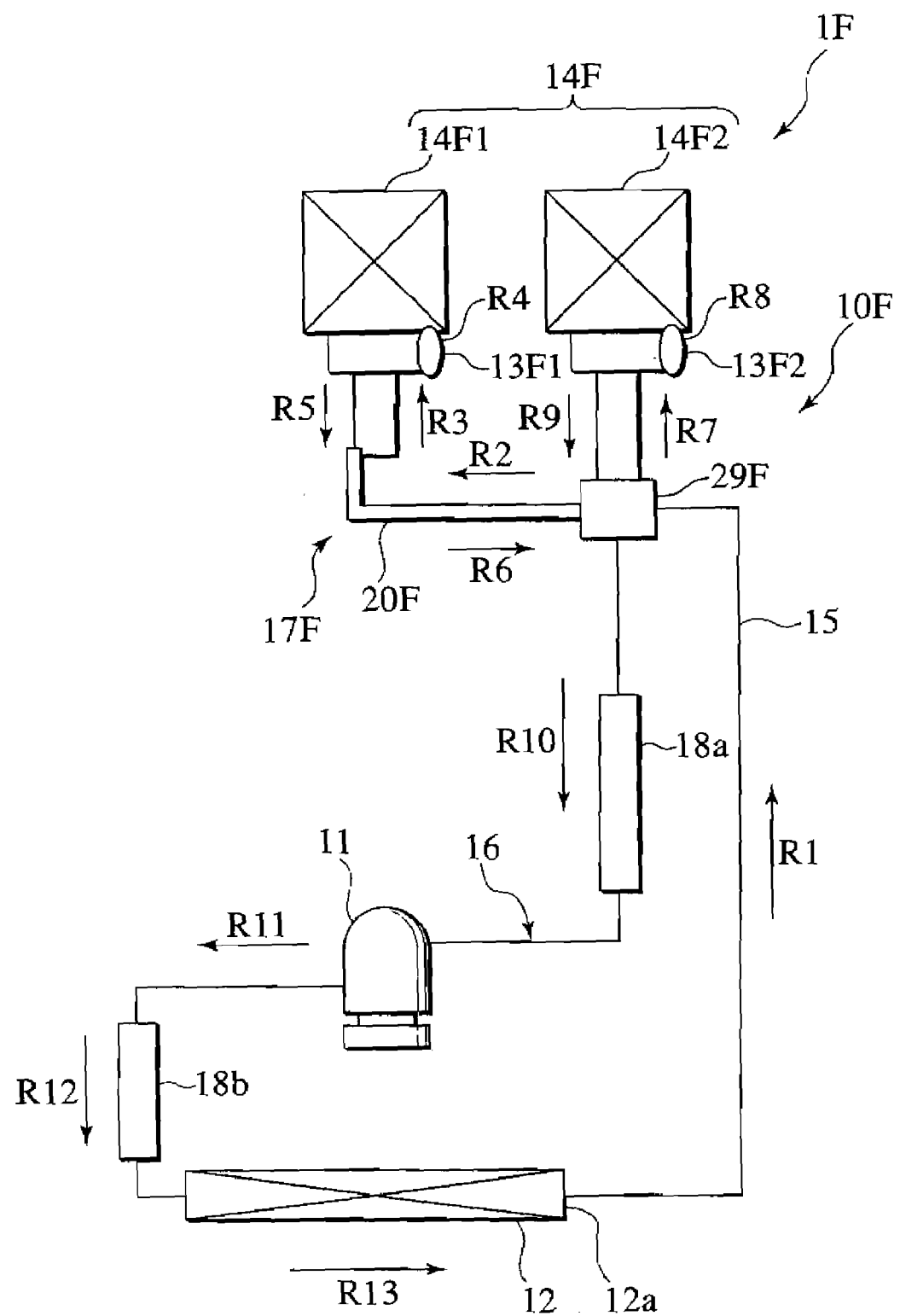
FIG. 7 is a schematic diagram of an air-conditioner according to a third embodiment.

Referring to FIG. 7, a vehicle air conditioner 10F is different from the vehicle air conditioner 10A of the first embodiment in that the air conditioner 10F includes two sets of throttles 13F (13F1 and 13F2) and evaporators 14F (14F1, 14F2). One set 13F1 and 14F1 is disposed for a front seat. The other set 13F2 and 14F2 is disposed for a rear seat. The throttles 13F1 and 13F2 expand refrigerants cooled by the condenser 12. The evaporators 14F1 and 14F2 cool and dehumidify air inside of the vehicle compartment by expanding refrigerants.

The refrigerant passage 15 is branched into two passages at the inlet of the double-tube structure 20F from the condenser 12. One of the passages is in fluid communication with the front-seat evaporator 14F1 via the front-seat throttle 13F1. The other of the passages is in fluid communication with the rear-seat evaporator 14F2 via the rear-seat throttle 13F2. The refrigerant through the front-seat evaporator 14F1 and the refrigerant through the rear-seat evaporator 14F2 join with each other at the outlet of the double-tube structure 20F toward compressor 11.

Figure 8:
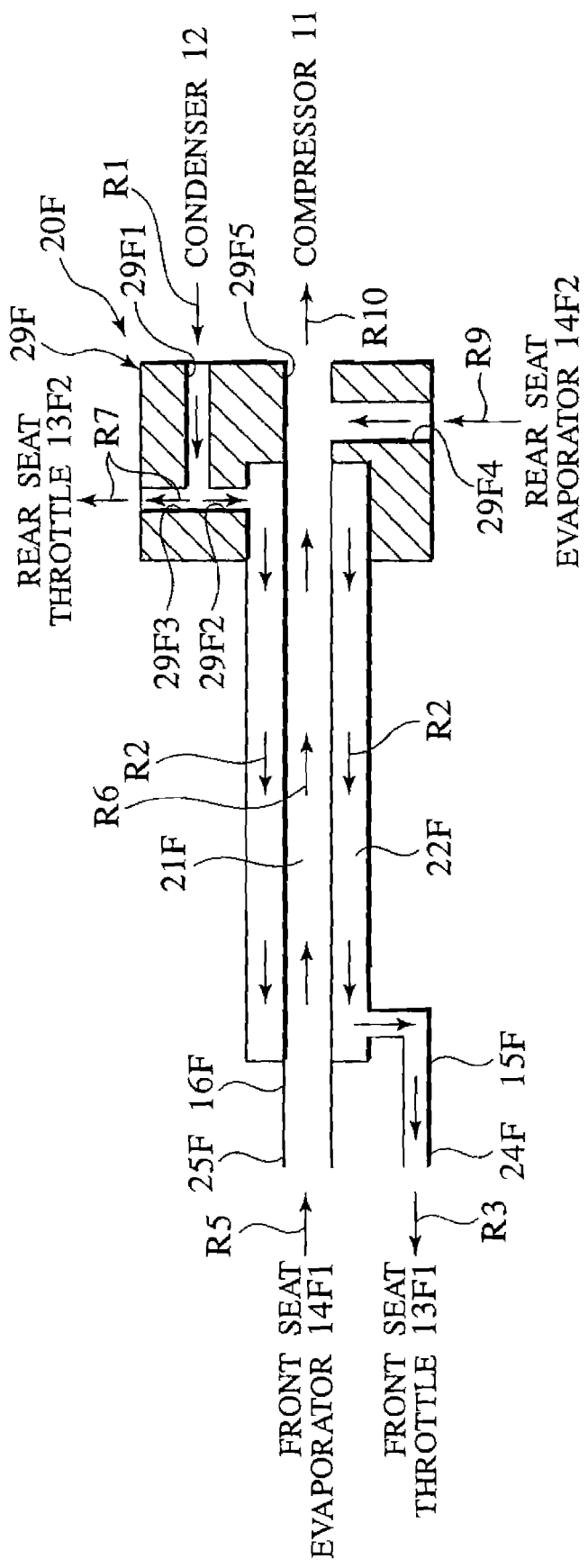
FIG. 8 is a schematic diagram of a primary portion of a double-tube structure of the air-conditioner shown in FIG. 7.

Specifically, referring to FIG. 8, the double-tube structure 20F includes an inner tube 21F in fluid communication with the front seat evaporator 14F1 through a pipe 16F. The double-tube structure 20F includes an outer tube 22F enclosing the inner tube 21F from the outside. The outer tube 22F is in fluid communication with the front-seat throttle 13F1 through a pipe 15F. The double-tube structure 20F includes a coupling 20F at the end. The coupling 20F includes a passage 29F1 in fluid communication with the refrigerant passage 15 or condenser 12. The coupling 20F includes passages 29F2 and 29F3 separated from the passage 29F1. The passage 29F2 is in fluid communication with the outer tube 22F. The passage 29F3 is in fluid communication with the rear-seat throttle 13F2. The coupling 20F includes a passage 29F4 in fluid communication with the rear-seat evaporator 14F2 and the inner tube 21F. The coupling 20F includes a passage 20F5 in fluid communication with the inner tube 21F and the refrigerant passage 16 or compressor 11.

The following describes the operations of the refrigeration cycle 1F and the air conditioner 10F.

Referring to FIG. 7, the refrigerant R1 flows from the condenser 12 into the coupling 29F. The refrigerant R1 is separated into refrigerants R2 and R7 in the coupling 29F. The refrigerant R2 runs through the refrigerant pipe 17F and flows out toward the front seat throttle 13F1 as a refrigerant R3. While, the refrigerant R7 flows out toward the rear seat throttle 13F2. The refrigerants R3 and R7 flow into the throttles 13F1 and 13F2, respectively, where the refrigerants are isenthalpic expanded therein, and flow out as refrigerants R4 and R8. The refrigerants R4 and R8 flow into evaporators 14F1 and 14F2, where the refrigerants are evaporated therein to absorb heat from air around the front and the rear seats inside of the vehicle compartment, thus reducing temperatures around the front and rear seats. The refrigerant R5 flows out of the evaporator 14F1 into the refrigerant pipe 17F, and the refrigerant R6 runs through the refrigerant pipe 17F. While, the refrigerant R9 flows from the evaporator 14F2 into the coupling 29F. The refrigerants R9 and R6 join together with each other in the coupling 29F, flowing out toward the compressor 11 as a refrigerant R10. The refrigerant R10 flows into the compressor 11, where the refrigerant is isentropically compressed, flowing out as a refrigerant R11 or R12. The refrigerant R12 flows into the condenser 12, where the refrigerant R13 is condensed to discharge heat.

Referring to FIG. 8, the operation is specifically described in the double-tube structure 20F. The refrigerant R1 flows through the passage 29F1 of the coupling 29F. The refrigerant R1 is separated into the refrigerants R2 and R7 at the junction of the coupling 29F, which run through the passages 29F2 and 29F3, respectively.

The refrigerant R2 runs through the outer tube 22F, and flows out of the outlet 24F of the pipe 15F toward the front-seat throttle 13F1 as the refrigerant R 3. While, the refrigerant R5 returns into the inlet 25F of the pipe 16F as the refrigerant R6 from the evaporator 14F1. The refrigerant R6 runs through the outer tube 22F toward the passage 29F5.

While, the refrigerant R7 flows out toward the rear-seat throttle 13F2. The refrigerant R9 returns to the passage 29F4 from the evaporator 14F2.

Specifically, the refrigerants R6 and R2 flow in the opposite directions from each other, and exchange heat with each other though the inner tube 21F.

The refrigerants R6 and R9 join together with each other at the passage 29F5, and flow out toward the compressor 11 as the refrigerant RIO.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An air-conditioner comprising:
    a compressor configured to compress a refrigerant;
    a condenser configured to condense the compressed refrigerant with air outside of a vehicle compartment;
    a throttle configured to expand the condensed refrigerant;
    an evaporator configured to evaporate the expanded refrigerant to cool air inside of the vehicle compartment and to eliminate moisture from the air,
    a first refrigerant passage having the condensed refrigerant between the condenser and the throttle;
    a second refrigerant passage having the evaporated refrigerant between the evaporator and the compressor; and
    a refrigerant pipe located between the first and second refrigerant passages and configured to exchange heat between the condensed refrigerant and the evaporated refrigerant,
    the refrigerant pipe comprising:
        a first refrigerant pipe in fluid communication with the first refrigerant passage;
        a second refrigerant pipe in fluid communication with the second refrigerant passage; and
        a coupling connecting the first refrigerant pipe to the first refrigerant passage and connecting the second refrigerant pipe to the second refrigerant passage,
        wherein the first refrigerant pipe has an inlet and an outlet longitudinally opposite to each other and the outlet is positioned lower than the inlet.

2. The air-conditioner of claim 1,
    wherein the refrigerant pipe separates the condensed refrigerant through the fist refrigerant passage into gaseous and liquid refrigerants.

3. The air-conditioner of claim 1,
    wherein the refrigerant pipe comprises a heat-transfer member longitudinally located between the first and second refrigerant pipes and configured to allow the condensed refrigerant and the evaporated refrigerant to exchange heat with each other through the heat-transfer member.

4. The air-conditioner of claim 3, wherein the heat-transfer member integrally connects an outer peripheral surface of one of the first and second refrigerant pipes and an inner peripheral surface of the other of the first and second refrigerant pipes.

5. The air-conditioner of claim 1, wherein one of the first and second refrigerant pipes is located inside the other of the first and second refrigerant pipes.

6. The air-conditioner of claim 5, wherein the second refrigerant pipe is located inside of the first refrigerant pipe.

7. The air-conditioner of claim 3, wherein the heat-transfer member integrally connects an outer peripheral surface of the first refrigerant pipe and an outer peripheral surface of the second refrigerant pipe.

8. The air-conditioner of claim 3, wherein the heat-transfer member separates a tube into the first and second refrigerant pipes.

9. The air-conditioner of claim 3, wherein the heat-transfer member integrally connects the first and second refrigerant pipes, wherein the refrigerant pipe is mountable in various directions.

10. The air-conditioner of claim 1, wherein the first refrigerant passage is located lower than a refrigerant outlet of the condenser.

11. The air-conditioner of claim 5, wherein one of the first and second refrigerant pipes has a drying agent charged therein.

12. The air-conditioner of claim 1, wherein the coupling comprises a first coupling configured to separate the condensed refrigerant into a first refrigerant to flow through the first refrigerant pipe and a second refrigerant,
wherein the throttle comprises:
   a first throttle configured to expand the first refrigerant; and
   a second throttle configured to expand the second refrigerant,
wherein the evaporator comprises:
   a first evaporator configured to evaporate the first expanded refrigerant to be discharged into the second refrigerant pipe; and
   a second evaporator configured to evaporate the second expanded refrigerant to be discharged into the second refrigerant passage through the first coupling.

13. An air-conditioner comprising:
a condenser configured to condense a refrigerant by air-flow during running of a vehicle;
an expansion valve configured to expand the condensed refrigerant;
an evaporator configured to evaporate the expanded refrigerant to cool air inside of a vehicle compartment;
a compressor configured to compress the evaporated refrigerant to be discharged to the condenser;
a heat exchanger configured to exchange heat between the condensed refrigerant and the evaporated refrigerant,
the heat exchanger comprising:
   a first fluid passage in fluid communication with the condenser and the expansion valve;
   a second fluid passage in fluid communication with the evaporator and the compressor; and
   a coupling connecting the first fluid passage to the condenser and the expansion valve and connecting the second fluid passage to the compressor and the evaporator,
wherein the first fluid passage has an inlet and an outlet longitudinally opposite to each other and the outlet is positioned lower than the inlet.

14. The air-conditioner of claim 13, wherein the first and second fluid passages are located concentrically with each other.

15. The air-conditioner of claim 13, wherein the first and second fluid passages are located eccentrically with each other.

16. The air-conditioner of claim 13, wherein the heat exchanger comprises a tube separated into the first and second fluid passages.

17. The air-conditioner of claim 13, wherein the first and second fluid passages connect longitudinally side-by-side to each other.

18. The air-conditioner of claim 13, wherein one of the first and second fluid passages is located inside of the other of the first and second fluid passages.

19. The air-conditioner of claim 18, wherein one of the first and second fluid passages has a drying agent charged therein.

20. The air-conditioner of claim 13, wherein the coupling comprises a second coupling connecting the first refrigerant pipe to the first throttle and connecting the second refrigerant pipe to the first evaporator.

21. The air-conditioner of claim 13, wherein the coupling separates the condensed refrigerant into a first refrigerant and a second refrigerant,
wherein the expansion valve comprises:
   a first expansion valve configured to expand the first refrigerant through the first fluid passage; and
   a second expansion valve configured to expand the second refrigerant,
wherein the evaporator comprises:
   a first evaporator configured to evaporate the first expanded refrigerant to be discharged into the second fluid passage; and
   a second evaporator configured to evaporate the second expanded refrigerant to be discharged to the second fluid passage through the coupling.

22. The air-conditioner of claim 13, wherein the coupling connects the first fluid passage to the expansion valve and connects the second fluid passage to the evaporator.

* * * * *